United States Patent
Shapira

(10) Patent No.: US 7,489,670 B2
(45) Date of Patent: Feb. 10, 2009

(54) DEVICE, SYSTEM AND METHOD OF UPLINK/DOWNLINK COMMUNICATION IN WIRELESS NETWORK

(75) Inventor: Nir Shapira, Raanana (IL)

(73) Assignee: Celeno Communications Ltd., Ra'anana (IL)

( * ) Notice: Subject to any disclaimer, the term of this patent is extended or adjusted under 35 U.S.C. 154(b) by 402 days.

(21) Appl. No.: 11/316,948

(22) Filed: Dec. 27, 2005

(65) Prior Publication Data

US 2007/0147312 A1 Jun. 28, 2007

(51) Int. Cl.
*H04Q 7/00* (2006.01)
(52) U.S. Cl. .................. 370/338; 370/328; 370/329; 370/335; 370/352; 370/449
(58) Field of Classification Search .............. 370/278, 370/279, 280, 294, 338, 335, 449, 352, 329, 370/328
See application file for complete search history.

(56) References Cited

U.S. PATENT DOCUMENTS

| | | | |
|---|---|---|---|
| 6,563,858 B1 | 5/2003 | Fakatselis et al. | |
| 6,873,293 B2 | 3/2005 | Proctor, Jr. et al. | |
| 6,928,047 B1 | 8/2005 | Xia | |
| 6,940,843 B2 | 9/2005 | Goodall et al. | |
| 6,961,545 B2 | 11/2005 | Tehrani et al. | |
| 6,970,682 B2 | 11/2005 | Crilly, Jr. et al. | |
| 7,034,759 B2 | 4/2006 | Proctor, Jr. et al. | |
| 7,039,090 B2 | 5/2006 | Boetzel et al. | |
| 7,039,137 B1 | 5/2006 | Lauterjung et al. | |
| 7,050,402 B2 | 5/2006 | Schmidl et al. | |
| 7,088,671 B1 | 8/2006 | Monsen | |
| 7,099,380 B1 | 8/2006 | Feng et al. | |
| 7,103,326 B2 | 9/2006 | Wu et al. | |
| 7,120,468 B1 | 10/2006 | Wilhoyte et al. | |
| 7,139,321 B2 | 11/2006 | Giannakis et al. | |
| 7,149,254 B2 | 12/2006 | Sampath | |
| 2002/0041635 A1 | 4/2002 | Ma et al. | |
| 2002/0150168 A1 | 10/2002 | Crawford | |
| 2002/0160737 A1 | 10/2002 | Crawford | |
| 2004/0258012 A1* | 12/2004 | Ishii | 370/328 |
| 2005/0025042 A1 | 2/2005 | Hadad | |
| 2005/0047322 A1 | 3/2005 | Sondur | |
| 2005/0047384 A1 | 3/2005 | Wax et al. | |
| 2005/0135284 A1* | 6/2005 | Nanda et al. | 370/294 |
| 2005/0136933 A1 | 6/2005 | Sandhu et al. | |
| 2005/0141412 A1 | 6/2005 | Sadri et al. | |
| 2005/0147023 A1 | 7/2005 | Stephens et al. | |

(Continued)

OTHER PUBLICATIONS

Tse et al., "Fundamentals of Wireless Communication", Sep. 10, 2004, pp. 523-548, Cambridge University Press.

(Continued)

*Primary Examiner*—Duc Nguyen
*Assistant Examiner*—Julio R Perez
(74) *Attorney, Agent, or Firm*—Pearl Cohen Zedek Latzer, LLP

(57) ABSTRACT

Devices, systems and methods of uplink/downlink communication in wireless network. For example, a wireless access point includes a transmitter to transmit a downlink frame having a duration field value equal to or greater than a sum of: a time period corresponding to transmission of the downlink frame, a time period corresponding to transmission of an acknowledgement frame, a constant waiting period, and a backoff period calculated using a maximum contention window parameter.

20 Claims, 2 Drawing Sheets

U.S. PATENT DOCUMENTS

| | | |
|---|---|---|
| 2005/0152324 A1* | 7/2005 | Benveniste ............... 370/338 |
| 2005/0233709 A1 | 10/2005 | Gardner et al. |
| 2005/0286474 A1 | 12/2005 | van Zeist et al. |
| 2006/0023803 A1 | 2/2006 | Pertman et al. |
| 2006/0062189 A1* | 3/2006 | Takeuchi ................. 370/338 |
| 2006/0092885 A1* | 5/2006 | Brockmann et al. ....... 370/335 |
| 2006/0140172 A1* | 6/2006 | Trainin ................... 370/352 |
| 2006/0165114 A1* | 7/2006 | Diepstraten et al. ....... 370/445 |
| 2006/0286937 A1 | 12/2006 | Russell et al. |
| 2006/0291439 A1 | 12/2006 | Yang et al. |
| 2006/0291544 A1 | 12/2006 | Fischer et al. |
| 2007/0077936 A1* | 4/2007 | Tomisawa et al. ......... 455/450 |

OTHER PUBLICATIONS

Yoo et al., On the Optimality of Multi-Antenna Broadcast Scheduling Using Zero-Forcing Beamforming, pp. 1-13.

* cited by examiner

DEVICE, SYSTEM AND METHOD OF UPLINK/DOWNLINK COMMUNICATION IN WIRELESS NETWORK

FIELD OF THE INVENTION

The invention relates to the field of wireless communication.

BACKGROUND OF THE INVENTION

A wireless communication network may include, for example, a wireless Access Point (AP) and multiple wireless communication stations able to communicate using a wireless medium. A communication collision may occur, for example, when a first wireless station and a second wireless station transmit data at substantially the same time.

To reduce communication collisions, a Collision Avoidance (CA) mechanism may be used. For example, a wireless station may avoid transmission for a "backoff" period of time, determined individually by the station based on a pseudo-random number of units between zero and a pre-defined maximum Contention Window (CW) parameter. Accordingly, a first station may avoid transmission for a first pseudo-random backoff period, and a second station may avoid transmission for a second, different, pseudo-random backoff period, thereby avoiding collision between the transmissions of the first and second stations. Furthermore, a retransmission procedure may be invoked upon detecting a communication collision.

Unfortunately, when multiple stations contend simultaneously for a wireless medium, the CA mechanism and/or the retransmission procedure may result in poor network performance, e.g., poor network throughput, which may not be resolved by adjusting the CW parameter. For example, setting the CW parameter at a low value may increase contentions, whereas setting the CW parameter at a high value may result in long transmission delays.

SUMMARY OF THE INVETION

Some embodiments of the invention may include, for example, devices, systems and method of uplink/downlink communication in wireless network.

In some embodiments, for example, a wireless access point may include a transmitter to transmit a downlink frame having a duration field value equal to or greater than a sum of: a time period corresponding to transmission of the downlink frame, a time period corresponding to transmission of an acknowledgement frame, a constant waiting period, and a backoff period calculated using a maximum contention window parameter.

In some embodiments, for example, the duration field value may be substantially equal to said sum.

In some embodiments, for example, the constant waiting period may include a pre-defined Distributed Inter-Frame Space waiting period.

In some embodiments, for example, the backoff period may include a time period having a number of time slots equal to a maximum size of the contention window.

In some embodiments, for example, wherein the time period corresponding to transmission of the acknowledgement frame may further include a Short Inter-Frame Space waiting period.

In some embodiments, for example, a wireless communication system may include: a wireless access point to transmit a downlink frame having a duration field value equal to or greater than a sum of: a time period corresponding to transmission of the downlink frame, a time period corresponding to transmission of an acknowledgement frame, a constant waiting period, and a backoff period calculated using a maximum contention window parameter; and a wireless communication station to receive the downlink frame from the wireless access point.

In some embodiments, for example, the station is to set a value of a Network Allocation Vector of the station to the value of the duration field of the downlink frame if the downlink frame is intended to be received by another station.

In some embodiments, for example, the station is to maintain a value of a Network Allocation Vector of the station unmodified if the downlink frame is intended to be received by said station.

In some embodiments, for example, the station is to decrement the value of the Network Allocation Vector of the station, and to transmit an uplink frame when the value of the Network Allocation Vector of the station reaches zero.

In some embodiments, for example, the wireless access point is to receive the uplink frame, to transmit an acknowledgment frame, and to gain control of a wireless medium of the wireless communication system prior to another uplink transmission.

In some embodiments, for example, the wireless access point is to transmit a subsequent downlink frame intended for reception by another station, the subsequent downlink frame having a duration field value substantially equal to the duration field value of said downlink frame.

In some embodiments, for example, a method may include transmitting a downlink frame having a duration field value equal to or greater than a sum of: a time period corresponding to transmission of the downlink frame, a time period corresponding to transmission of an acknowledgement frame, a constant waiting period, and a backoff period calculated using a maximum contention window parameter.

In some embodiments, for example, the method may include calculating the constant waiting period based on a pre-defined Distributed Inter-Frame Space parameter.

In some embodiments, for example, the method may include maintaining unmodified a value of a Network Allocation Vector of a station if the downlink frame is intended to be received by said station.

In some embodiments, for example, the method may include decrementing the value of the Network Allocation Vector of the station; and transmitting an uplink frame when the value of the Network Allocation Vector of the station reaches zero.

In some embodiments, for example, the method may include receiving the uplink frame; transmitting an acknowledgment frame; and gaining control of a wireless medium prior to another uplink transmission.

In some embodiments, for example, the method may include transmitting a subsequent downlink frame intended for reception by another station, the subsequent downlink frame having a duration field value equal to the duration field value of said downlink frame.

In some embodiments, for example, the method may include calculating the constant waiting period based on a pre-defined Distributed Inter-Frame Space parameter.

In some embodiments, for example, the method may include calculating the time period corresponding to transmission of the acknowledgement frame taking into account a Short Inter-Frame Space waiting period.

Embodiments of the invention may provide other benefits and/or advantages.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
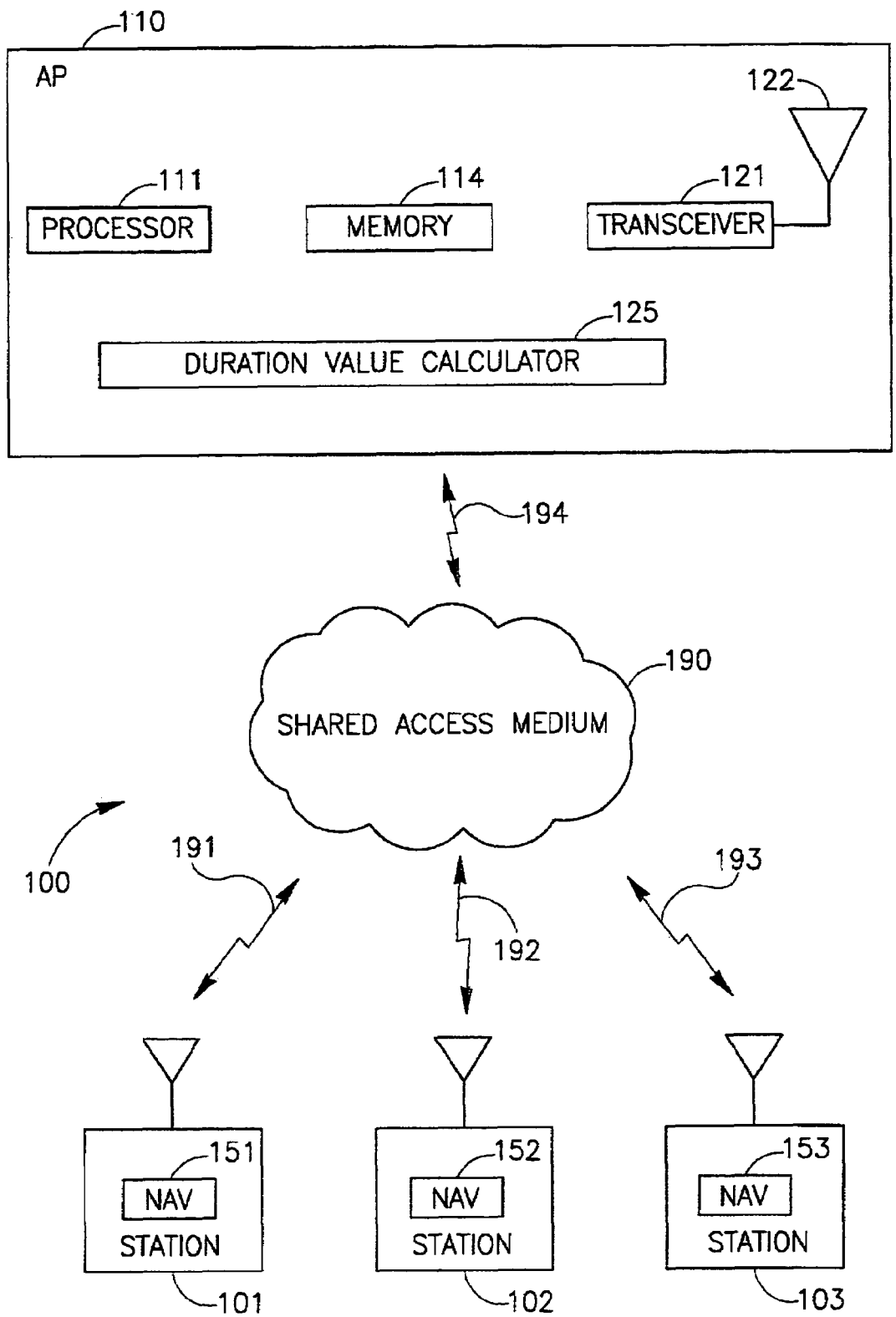
FIG. 1 is a schematic block diagram illustration of a wireless communication system utilizing uplink/downlink communication in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with many apparatuses and systems, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a wireless network, a Local Area Network (LAN), a Wireless LAN (WLAN), devices and/or networks operating in accordance with existing IEEE 802.11, 802.11a, 802.11b, 802.11e, 802.11g, 802.11 h, 802.11i, 802.11n, 802.16 standards and/or future versions of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier-Modulation (MDM), Discrete Multi-Tone (DMT), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of stations" may include two or more stations.

FIG. 1 schematically illustrates a block diagram of a wireless communication system 100 utilizing uplink/downlink communication in accordance with an embodiment of the invention. System 100 may include, for example, one or more wireless Access Points (APs), e.g., an AP 110, and one or more wireless communication stations, e.g., stations 101-103. Station 101, station 102, station 103 and AP 110 may communicate using a shared access medium 190, for example, through wireless communication links 191, 192, 193 and 194, respectively. System 100 may optionally include other and/or additional components.

AP 110 may include, for example, a processor 111, a memory unit 114, and a transceiver 121. AP 110 may further include other suitable hardware components and/or software components.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 111 may, for example, process data received by AP 110, and/or process data intended for transmission by AP 110.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Memory unit 114 may, for example, store data received by AP 110, and/or store data intended for transmission by AP 110.

Transceiver 121 may include, may include, for example, a wireless Radio Frequency (RF) transceiver able to transmit and/or receive RF signals, e.g., through an antenna 122. Transceiver 121 may be implemented using a transmitter, a receiver, a transmitter-receiver, or one or more units able to perform separate or integrated functions of transmitting and/or receiving wireless communication signals, blocks, frames, transmission streams, packets, messages and/or data.

Antenna 122 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

Station 101, station 102 and station 103 may include, for example, a wireless communication station or a wireless communication device able to transmit and/or receive wireless communication signals. Stations 101, 102 and 103 may include, for example, Network Allocation Vectors (NAVs) 151, 152 and 153, which may include a counter decremented towards zero.

The value of NAV 151 of station 101 may be set by the station 101 to a value of a duration field included in a received Medium Access Control (MAC) frame. Once the value of NAV 151 is set, the value is gradually decremented toward zero. Station 101 may not be permitted to transmit as long as the value of NAV 151 is greater than zero.

Once the value of NAV 151 reaches zero, station 101 may be permitted to transmit after a waiting period elapses. The waiting period may include, for example, a pre-defined (e.g., constant or fixed) period which may be referred to as Inter-Frame Space (IFS), e.g., a Distributed IFS (DIFS); and a variable-length waiting period which may be referred to as a backoff period. The length of the backoff period may be determined by station 101 by drawing, e.g., randomly or pseudo-randomly, a number between zero and a Contention Window (CW) parameter; the drawn number indicates the number of time slots to be included in the backoff period of station 101. It is noted that the IFS waiting period may include one or more portions, or may be based on one or more IFS parameters, for example, DIFS, Short IFS (SIFS), or the like.

Once the waiting period of station 101 elapses, e.g., once the IFS period (e.g., the DIFS period) and the backoff period elapse, station 101 may transmit, e.g., if a carrier sense mechanism of station 101 determines that the wireless medium is free, and/or if the value of NAV 151 is zero.

In some embodiments, AP 110 may transmit a downlink frame intended for reception by a certain station, e.g., by station 101. In one embodiment, the frame may be a frame of data intended for transmission from AP 110 to station 101. In another embodiment, for example, if no such data frame is available fort transmission from AP 110 to station 101, the AP 110 may transmit a null-data downlink frame intended for reception by station 101.

The downlink frame may include a duration field having a pre-defined duration value. The duration value may be calculated by a Duration Value Calculator (DVC) 125 of AP 110 prior to transmission of the downlink frame. The DVC 125 may be implemented, for example, as a hardware component, as a software component, as a combined hardware/software component, as part of processor 111, as part of transceiver 121, as a unit or sub-unit of AP 110, as part of a MAC module or MAC layer or MAC component of AP 110, as a communication driver, as a dedicated controller, as an Integrated Circuit (IC), or the like. In some embodiments, the DVC 125 may be operatively associated with, or may communicate with, one or more components of AP 110, for example, processor 111, transceiver 121, a MAC module, a MAC component, a MAC layer, other (e.g., upper) layers of AP 110, layers or components or controllers of AP 110 which may control or perform downlink and/or uplink scheduling, or the like.

In some embodiments, the duration value ("DV") calculated by the DVC 125 may be equal to, or greater from, the sum of: a time period corresponding to transmission of a downlink frame ("Downlink_Time"), a time period corresponding to transmission of an acknowledgement (ACK) frame ("ACK_Time"), a time period corresponding to an IFS (e.g., DIFS) period ("IFS_Time"), and a time period corresponding to the maximum backoff period (e.g., a number of time slots equal to the maximum CW value) ("CW_Max"). In some embodiments, the ACK_Time may include, for example, a time period corresponding to transmission of an acknowledgement (ACK) frame and a Short ISF (SIFS) period.

In one embodiment, for example, DVC 125 may utilize the following equation:

$$DV = \text{Downlink\_Time} + \text{ACK\_Time} + \text{IFS\_Time} + \text{CW\_Max} \quad \text{Equation 1}$$

In another embodiment, for example, DVC 125 may utilize the following equation:

$$DV = \text{Downlink\_Time} + \text{ACK\_Time} + \text{IFS\_Time} + \text{CW\_Max} + \text{Epsilon} \quad \text{Equation 2}$$

wherein Epsilon may be a positive number of time slots or time units.

In yet another embodiment, for example, DVC 125 may utilize the following equation:

$$DV = (\text{Downlink\_Time} + \text{ACK\_Time} + \text{IFS\_Time} + \text{CW\_Max}) \cdot K \quad \text{Equation 3}$$

wherein K may be a number greater than one, for example, 1.10, or 1.25, or 1.50, or the like.

In still another embodiment, for example, DVC 125 may utilize the following equation:

$$DV = (\text{Downlink\_Time} + \text{ACK\_Time} + \text{SIFS\_Time} + \text{DIFS\_Time} + \text{CW\_Max}) \quad \text{Equation 4}$$

wherein, for example, SIFS_Time may be a SIFS waiting period and DIFS_Time may be a DIFS waiting period. In some embodiments, for example, the right side of Equation 4 may be multipled by K as in Equation 3, or may be added to Epsilon as in Equation 2.

In some embodiments, for example, DVC 125 may use other suitable functions or formulae to calculate DV, for example, utilizing one or more of these inequalities:

$$DV \geq \text{Downlink\_Time} + \text{ACK\_Time} + \text{IFS\_Time} + \text{CW\_Max} \quad \text{Inequality 1}$$

$$DV > \text{Downlink\_Time} + \text{ACK\_Time} + \text{IFS\_Time} + \text{CW\_Max} \quad \text{Inequality 2}$$

$$DV \geq \text{Downlink\_Time} + \text{ACK\_Time} + \text{IFS\_Time} + \text{CW\_Max} + \text{Epsilon} \quad \text{Inequality 3}$$

$$DV > \text{Downlink\_Time} + \text{ACK\_Time} + \text{IFS\_Time} + \text{CW\_Max} + \text{Epsilon} \quad \text{Inequality 4}$$

$$DV \geq (\text{Downlink\_Time} + \text{ACK\_Time} + \text{IFS\_Time} + \text{CW\_Max}) \cdot K \quad \text{Inequality 5}$$

$$DV > (\text{Downlink\_Time} + \text{ACK\_Time} + \text{IFS\_Time} + \text{CW\_Max}) \cdot K \quad \text{Inequality 6}$$

$$DV \geq (\text{Downlink\_Time} + \text{ACK\_Time} + \text{SIFS\_Time} + \text{DIFS\_Time} + \text{CW\_Max}) \quad \text{Inequality 7}$$

$$DV > (\text{Downlink\_Time} + \text{ACK\_Time} + \text{SIFS\_Time} + \text{DIFS\_Time} + \text{CW\_Max}) \quad \text{Inequality 8}$$

Stations 101, 102 and 103 may receive the downlink frame transmitted by AP 110. Upon receiving the downlink frame, station 102 may set its NAV 152 and station 103 may set its NAV 153 based on the DV included in the downlink frame. As a result, station 102 and station 103 may avoid transmission for a time period which may be equal to, or greater from, the sum of: a time corresponding to transmission of an acknowledgement (ACK) frame, a time period corresponding to an IFS period (e.g., a DIFS period), and a time period corresponding to the maximum backoff period (e.g., a number of time slots equal to the maximum CW value).

In contrast, upon receiving the downlink frame transmitted by AP 110, station 101 may not set its NAV 151. This may be performed, for example, utilizing a wireless communication standard or protocol (e.g., 802.11) according to which the station, which is intended to receive the downlink frame transmitted by the AP 110, does not modify or set its NAV. For example, upon receiving the downlink frame, station 110 may maintain its NAV 151 value unmodified, or may avoid setting or updating its NAV 151. As a result, the waiting period utilized by station 101 prior to transmission of an uplink frame, may be different, e.g., shorter, than the waiting periods utilized by stations 102 and 103 prior to transmission of an uplink frame. For example, NAV 151 of station 101 may reach zero before NAV 152 of station 102 reaches zero and before NAV 153 of station 103 reaches zero. Accordingly, station 101 may be permitted to transmit an uplink frame while stations 102-103 may not yet be permitted to transmit an uplink frame, thereby allowing station 101 to transmit an uplink frame without communication collisions.

Once the NAV 151 of station 101 reaches zero, station 101 may transmit an uplink frame. In response, AP 110 may transmit to station 101 an acknowledgement (ACK) frame. AP 110 may then repeat the process, for example, by transmitting a downlink frame intended for reception by another station, e.g., station 102. This may allow the AP 110 to schedule uplink and/or downlink transmissions, e.g., with regard to one station at a time, while eliminating or reducing collisions.

In some embodiments, AP 110 may "grab" control of the shared access medium 190, e.g., subsequent to an uplink transmission by station 101 and prior to potential transmissions by stations 102 and/or 103. For example, AP 110 may receive the uplink frame transmitted by station 101, and may transmit a downlink frame (e.g., to station 101, to station 102, or to station 103) within a time period which may be shorter than the IFS (e.g., the DIFS) period. This may, for example, ensure that the downlink frame is transmitted after the uplink frame is received and prior to subsequent uplink transmissions.

Figure 2:
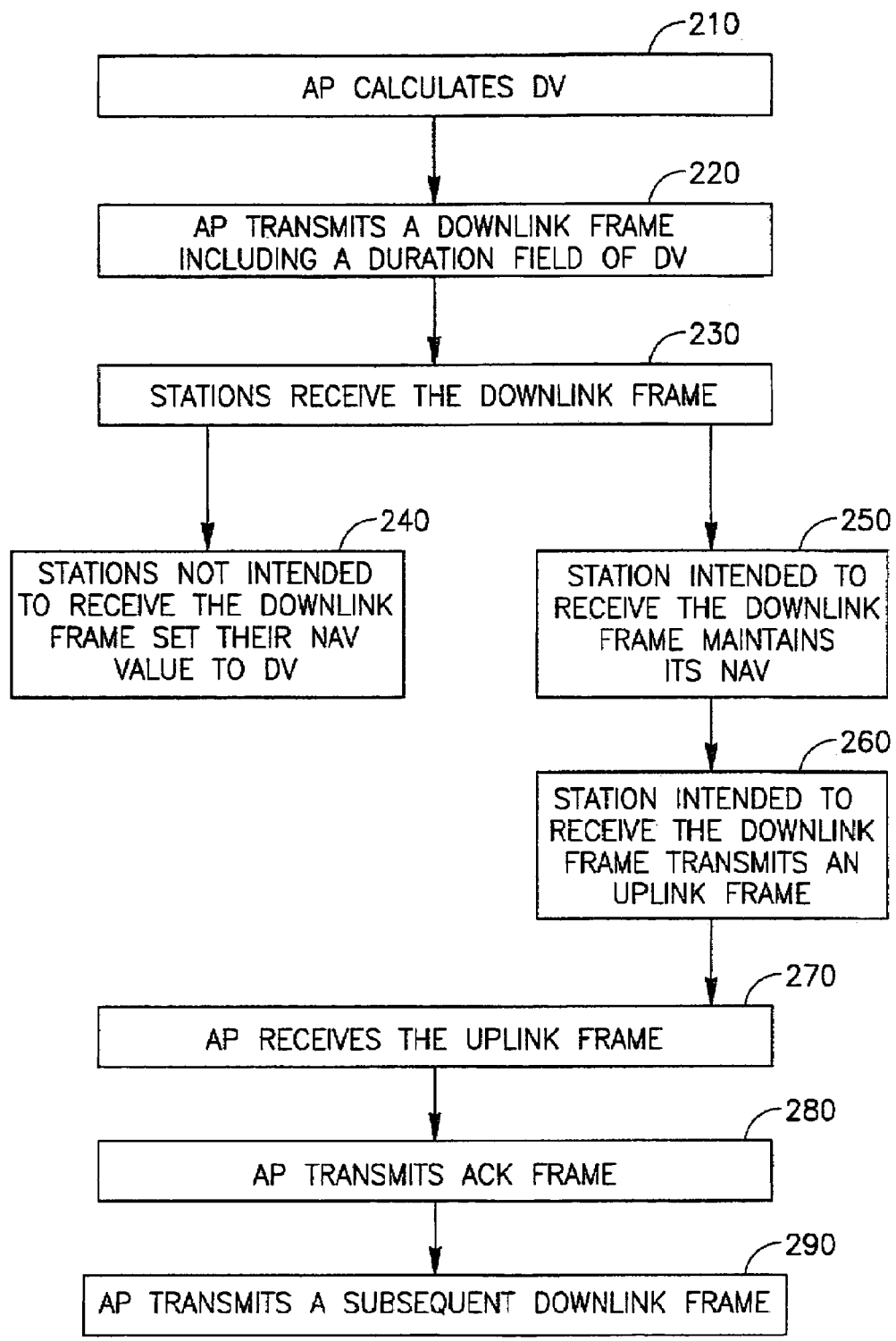
FIG. 2 is a schematic flow-chart of a method of uplink/downlink communication in accordance with an embodiment of the invention.

Reference is made to FIG. 2, which is a schematic flowchart of a method of uplink/downlink communication in accordance with an embodiment of the invention. Operations of the method may be implemented, for example, by system 100 of FIG. 1, by AP 110 of FIG. 1, by DVC 125 of FIG. 1, and/or by other suitable APs, transceivers, units, devices, and/or systems.

As indicated at box 210, the method may include, for example, calculating a DV. The DV may be equal to, or greater from, the sum of: a time period corresponding to transmission of a downlink frame, a time period corresponding to transmission of an acknowledgement (ACK) frame, a time period corresponding to an IFS (e.g., a DIFS) period, and a time period corresponding to the maximum backoff period (e.g., a number of time slots equal to the maximum CW value). This may be performed, for example, by DVC 125 of FIG. 1.

As indicated at box 220, the method may include, for example, transmitting a downlink frame including a duration field having a value equal to DV. The downlink frame may be intended for reception by a certain station. The transmission may be performed, for example, by transceiver 121 of FIG. 1.

As indicated at box 230, the method may include, for example, receiving the downlink frame. This may be performed, for example, by one or more stations, e.g., stations 101-103 of FIG. 1.

The method may further include one or more branches of operations, which may be performed by various stations. For example, as indicated at box 240, station(s) not intended to receive the downlink frame may set their NAVs value to the DV included in the downlink frame. In contrast, as indicated at box 250, the station intended to receive the downlink frame may maintain its NAV value and may avoid setting its NAV value to the DV included in the downlink frame.

As indicated at box 260, the method may further include, for example, transmitting an uplink frame. This may be performed, for example, by the station that avoided setting its NAV value to the DV included in the downlink frame; the transmission may begin once the NAV of this station reaches zero, or shortly afterwards (e.g., after a backoff period).

As indicated at box 270, the method may include, for example, receiving the uplink frame. This may be performed, for example, by the AP 110 of FIG. 1.

As indicated at box 280, the method may include, for example, transmitting an acknowledgment (ACK) frame. This may be performed, for example, by the AP 110 of FIG. 1.

As indicated at box 290, the method may include, for example, transmitting a subsequent downlink frame. Optionally, this may be performed within a time period which is smaller than the IFS (e.g., DIFS) time period after the reception of the uplink frame ended.

One or more of the above operations may be repeated. Other suitable operations or sets of operations may be used in accordance with embodiments of the invention.

Some embodiments of the invention may be used, for example, in conjunction with Voice Over Internet Protocol (VoIP) applications, applications utilizing substantially symmetric communications, and/or applications utilizing a substantially constant bit rate, application utilizing communication at pre-defined time intervals, or the like.

For example, in a communication system according to one embodiment, an AP may support, for example, ten VoIP calls performed by ten, respective, stations. VoIP frames may be transmitted at pre-defined time intervals, e.g., 20 milliseconds, at both uplink and downlink directions. The AP may divide the 20 milliseconds time interval to multiple slots, for example, ten two-milliseconds slots, e.g., similar to Time-Division Multiple Access (TDMA). A two-millisecond slot may be divided into a downlink slot and a corresponding uplink slot. In each of the ten two-millisecond slots, the AP may utilize the scheduling mechanism described above in relation to each of the ten stations, respectively. For example, in the first two-millisecond slot, the AP may utilize the scheduling mechanism to permit a first station to transmit an uplink frame; in the second two-millisecond slot, the AP may utilize the scheduling mechanism to permit a second station to transmit an uplink frame; in the third two-millisecond slot, the AP may utilize the scheduling mechanism to permit a third station to transmit an uplink frame; etc.

For example, in the first two-millisecond slot, the AP may transmit a downlink VoIP frame intended for reception by the first station. The duration field of the downlink VoIP frame may include a duration value, which may be used by other stations to set their NAVs, such that the first station may transmit an uplink VoIP frame without contention. In one embodiment, for example, the AP may set the duration field to a value substantially equal to 1.5 times the slot time, e.g., approximately three milliseconds. This may allow the AP to regain control of the medium at the beginning of a subsequent time slot.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by AP 110 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless access point comprising:
    a transmitter to transmit a downlink frame having a duration field value equal to or greater than a sum of: a time period corresponding to transmission of the downlink frame, a time period corresponding to transmission of an acknowledgement frame, a constant waiting period, and a backoff period calculated using a maximum contention window parameter.

2. The wireless access point of claim 1, wherein the duration field value is equal to said sum.

3. The wireless access point of claim 1, wherein the constant waiting period comprises a pre-defined Distributed Inter-Frame Space waiting period.

4. The wireless access point of claim 1, wherein the backoff period comprises a time period including a number of time slots equal to a maximum size of the contention window.

5. The wireless access point of claim 1, wherein the time period corresponding to transmission of the acknowledgement frame further comprises a Short Inter-Frame space waiting period.

6. A wireless communication system comprising:
    a wireless access point to transmit a downlink frame having a duration field value equal to or greater than a sum of: a time period corresponding to transmission of the downlink frame, a time period corresponding to transmission of an acknowledgement frame, a constant waiting period, and a backoff period calculated using a maximum contention window parameter; and
    a wireless communication station to receive the downlink frame from the wireless access point.

7. The wireless communication system of claim 6, wherein the duration field value is equal to said sum.

8. The wireless communication system of claim 6, wherein the station is to set a value of a Network Allocation Vector of the station to the value of the duration field of the downlink frame if the downlink frame is intended to be received by another station.

9. The wireless communication system of claim 6, wherein the station is to maintain a value of a Network Allocation Vector of the station unmodified if the downlink frame is intended to be received by said station.

10. The wireless communication system of claim 9, wherein the station is to decrement the value of the Network Allocation Vector of the station, and to transmit an uplink frame when the value of the Network Allocation Vector of the station reaches zero.

11. The wireless communication system of claim 10, wherein the wireless access point is to receive the uplink frame, to transmit an acknowledgment frame, and to gain control of a wireless medium of the wireless communication system prior to another uplink transmission.

12. The wireless communication system of claim 11, wherein the wireless access point is to transmit a subsequent downlink frame intended for reception by another station, the subsequent downlink frame having a duration field value equal to the duration field value of said downlink frame.

13. A method comprising:
    transmitting a downlink frame having a duration field value equal to or greater than a sum of: a time period corresponding to transmission of the downlink frame, a time period corresponding to transmission of an acknowledgement frame, a constant waiting period, and a backoff period calculated using a maximum contention window parameter.

14. The method of claim 13, comprising:
    calculating the constant waiting period based on a pre-defined Distributed Inter-Frame Space parameter.

15. The method of claim 13, further comprising:
    maintaining unmodified a value of a Network Allocation Vector of a station if the downlink frame is intended to be received by said station.

16. The method of claim 15, further comprising:
    decrementing the value of the Network Allocation Vector of the station; and transmitting an uplink frame when the value of the Network Allocation Vector of the station reaches zero.

17. The method of claim 16, further comprising:

receiving the uplink frame;

transmitting an acknowledgrnent frame; and gaining control of a wireless medium prior to another uplink transmission.

18. The method of claim 17, further comprising:

transmitting a subsequent downlink frame intended for reception by another station, the subsequent downlink frame having a duration field value equal to the duration field value of said downlink frame.

19. The method of claim 13, comprising:

calculating the constant waiting period based on a predefined Distributed Inter-Frame Space parameter.

20. The method of claim 13, comprising:

calculating the time period corresponding to transmission of the acknowledgement frame taking into account a Short Inter-Frame Space waiting period.

* * * * *